United States Patent
Punniyamurthy et al.

(10) Patent No.: US 12,353,320 B2
(45) Date of Patent: Jul. 8, 2025

(54) LOW LATENCY OFFLOADING OF COLLECTIVES OVER A SWITCH

(71) Applicants: Advanced Micro Devices, Inc, Santa Clara, CA (US); ATI Technologies ULC, Markham (CA)

(72) Inventors: Kishore Punniyamurthy, Austin, TX (US); Richard David Sodke, Kelowna (CA); Furkan Eris, Sunnyvale, CA (US); Sergey Blagodurov, Bellevue, WA (US); Bradford Michael Beckmann, Kirkland, WA (US); Brandon Keith Potter, Troup, TX (US); Khaled Hamidouche, Austin, TX (US)

(73) Assignees: Advanced Micro Devices, Inc; ATI Technologies ULC, Markham (CA)

( * ) Notice: Subject to any disclaimer, the term of this patent is extended or adjusted under 35 U.S.C. 154(b) by 48 days.

(21) Appl. No.: 18/240,640

(22) Filed: Aug. 31, 2023

(65) Prior Publication Data
US 2025/0077409 A1    Mar. 6, 2025

(51) Int. Cl.
*G06F 12/02*    (2006.01)
*G06F 13/16*    (2006.01)
(Continued)

(52) U.S. Cl.
CPC ........ *G06F 12/023* (2013.01); *G06F 13/1673* (2013.01); *G06F 13/28* (2013.01); *G06F 13/4022* (2013.01); *G06F 13/404* (2013.01)

(58) Field of Classification Search
CPC .... G06F 12/023; G06F 13/1673; G06F 13/28; G06F 13/4022; G06F 13/404
See application file for complete search history.

(56) References Cited

U.S. PATENT DOCUMENTS 6,151,668 A    11/2000 Pechanek et al.
6,356,994 B1 *   3/2002 Barry ................... G06F 9/32
                                                   712/18
(Continued)

FOREIGN PATENT DOCUMENTS

WO    2025049589 A1    3/2025

OTHER PUBLICATIONS

Dalton, B. et al., Memory Management Techniques for Exploiting RDMA in PGAS Languages; Sep. 2014, The 27th International Workshop on Languages and Compilers for Parallel Computing (LCPC); retrevied online Mar. 2025, DOI:10.1007/978-3-319-17473-0_13 (Year: 2014).*

(Continued)

*Primary Examiner* — Eric T Oberly
(74) *Attorney, Agent, or Firm* — FIG. 1 Patents

(57) ABSTRACT

A device includes a plurality of processing elements (PEs). A symmetric memory is allocated in each of the plurality of PEs. The device includes a switch connected to the plurality of PEs. The switch is to: receive, from a first processing element (PE) of the plurality of PEs, a message that includes a buffer offset, compute, based on the buffer offset, a first memory address of a first buffer in a first symmetric memory of the first PE and a second memory address of a second buffer in a second symmetric memory of a second PE of the plurality of PEs, and initiate, based on the first memory address and the second memory address, a direct memory access operation to access the first buffer and the second buffer.

20 Claims, 5 Drawing Sheets

(51) Int. Cl.
  *G06F 13/28* (2006.01)
  *G06F 13/40* (2006.01)

(56) References Cited

U.S. PATENT DOCUMENTS

| | | | |
|---|---|---|---|
| 8,615,623 | B2 | 12/2013 | Hidaka et al. |
| 2002/0174318 | A1 | 11/2002 | Stuttard et al. |
| 2006/0047771 | A1 | 3/2006 | Blackmore et al. |
| 2019/0303205 | A1* | 10/2019 | Masputra ............... G06F 12/10 |
| 2019/0324917 | A1 | 10/2019 | Cui et al. |

OTHER PUBLICATIONS

"Collecting a dynamic binary trace.", IBM Support [retrieved Feb. 15, 2023]. Retrieved from the Internet <https://www.ibm.com/support/pages/collecting-dynamic-binary-trace>., 3 Pages.

"strace(1)—Linux manual page", jambit GmbH [retrieved Feb. 15, 2023]. Retrieved from the Internet <https://man7.org/linux/man-pages/man1/strace.1.html>., 21 Pages.

Anguelkov, Hugues, et al., "Reverse-engineering Broadcom wireless chipsets", Quarkslab's blog [retrieved Feb. 15, 2023]. Retrieved from the Internet <https://blog.quarkslab.com/reverse-engineering-broadcom-wireless-chipsets.html>., Apr. 16, 2019, 39 Pages.

Bhansali, Sanjay, et al., "Framework for Instruction-level Tracing and Analysis of Program Executions", Proceedings of the 2nd international conference on Virtual execution environments[retrieved Feb. 15, 2023]. Retrieved from the Internet <https://www.usenix.org/legacy/events/vee06/full_papers/p154-bhansali.pdf>., Jun. 14, 2006, 10 Pages.

Chipounov, Vitaly, et al., "Reverse-Engineering Drivers for Safety and Portability", Proceedings of the Fourth conference on Hot topics in system dependability [retrieved Feb. 15, 2023]. Retrieved from the Internet <<https://www.usenix.org/legacy/event/hotdep08/tech/full_papers/chipounov/chipounov_html/index.html>., Dec. 7, 2007, 10 Pages.

Halon, Jack, "Reverse Engineering Network Protocols", Jack Hacks [retrieved Feb. 15, 2023]. Retrieved from the Internet <https://jhalon.github.io/reverse-engineering-protocols/>., Mar. 24, 2018, 25 Pages.

Khamidouche, "ROCm OpenSHMEM (ROC_SHMEM)", GitHub, Inc., [retrieved Feb. 15, 2023]. Retrieved from the Internet <https://github.com/ROCm-Developer-Tools/ROC_SHMEM>., Jul. 2019, 7 Pages.

Klenk, Benjamin, et al., "An in-network architecture for accelerating shared-memory multiprocessor collectives", Proceedings of the ACM/IEEE 47th Annual International Symposium on Computer Architecture [retrieved Feb. 15, 2023]. Retrieved from the Internet <https://ieeexplore.ieee.org/stamp/stamp.jsp?arnumber=9138924>., Sep. 23, 2020, 14 Pages.

NVIDIA, "Cloud & Data Center", NVIDIA Corporation [retrieved Feb. 15, 2023]. Retrieved from the Internet <https://www.nvidia.com/en-us/data-center/nvlink/>., Apr. 5, 1993, 6 Pages.

NVIDIA, "NVIDIA® Mellanox® Scalable Hierarchical Aggregation and Reduction Protocol (SHARP)", NVIDIA Corporation & affiliates [retrieved Feb. 15, 2023]. Retrieved from the Internet <https://docs.nvidia.com/networking/display/sharpv214>., 2 Pages.

Sadayappan, Ponnuswamy, et al., "Scalable Hierarchical Aggregation and Reduction Protocol (SHARP)TM Streaming-Aggregation Hardware Design and Evaluation", Pub Med Central [retrieved Feb. 15, 2023]. Retrieved from the Internet <https://www.ncbi.nlm.nih.gov/pmc/articles/PMC7295336/>., May 22, 2020, 19 Pages.

"International Search Report and Written Opinion", International Application No. PCT/US2024/044206, Dec. 12, 2024, 8 pages.

\* cited by examiner

LOW LATENCY OFFLOADING OF COLLECTIVES OVER A SWITCH

BACKGROUND

Some parallel computing systems used in data processing applications (e.g., machine learning) rely on a network of nodes to perform collective operations (e.g., all-reduce, all-to-all, etc.). Typically, a node passes messages to other nodes via a communication path that is based on a network topology of the system. As such, system performance could be limited by network contention due to bandwidth constraints between connected nodes.

DETAILED DESCRIPTION

Overview

Figure 1:
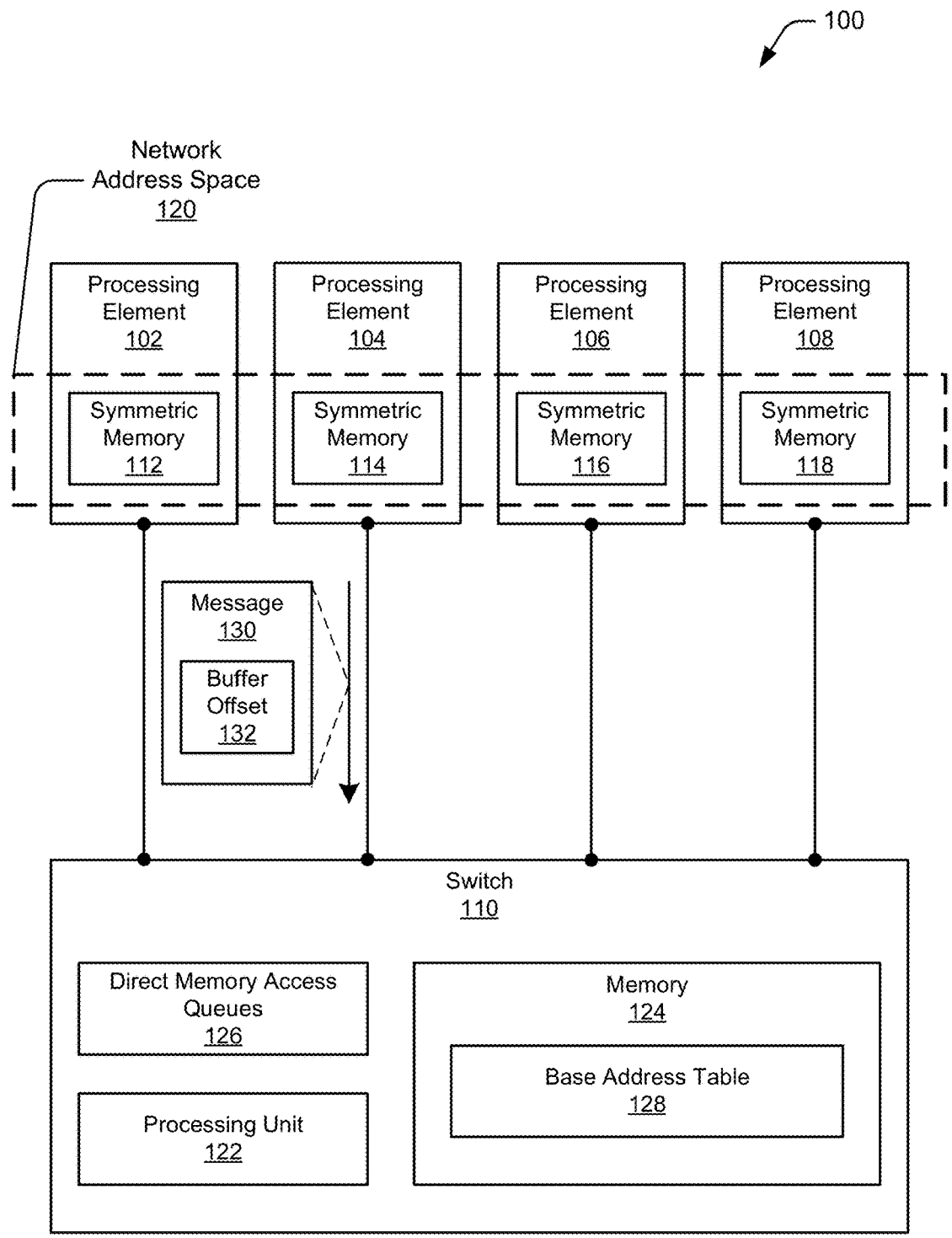
FIG. 1 is a block diagram of a non-limiting example distributed computing system for triggering and/or offloading collective operations over a switch.

Scalable hierarchical aggregation and reduction protocol (SHARP) and other in-network collective procedures enable a hardware-based streaming aggregation transmission (SAT) capability on fabric switches. This capability may improve the efficiency of some collective operations by offloading them to a switch to reduce network congestion. For example, a switch connected to multiple processing units (e.g., graphics processing units (GPUs)) may perform a collective operation by accessing individual data elements stored in the GPUs connected to the switch (e.g., via direct memory access (DMA) operations).

To trigger and/or offload a collective operation onto the switch, each of a group of GPUs assigned to the collective operation typically sends a message to the switch. The message includes information such as send/receive buffer memory addresses in the GPU's memory, a collective operation type, size, a group identifier (e.g., bitmask that identifies which GPUs have input data elements for the collective operation), etc. The switch processes incoming DMA packets or descriptors from the GPUs to load the input data elements from send buffers of the GPUs and perform the collective operation. However, this approach requires atomic operations to synchronize DMA writes from different GPUs, resulting in a latency overhead that is proportional to the number of participating GPUs. In an alternative approach, the group of GPUs first perform an all-gather operation to assemble a single large DMA packet that includes buffer addresses of all the participating GPUs. However, this approach also increases the overall latency of the collective operation significantly due to associated communications (e.g., all-gather operation) between the participating GPUs.

Low latency procedures for triggering and/or offloading collectives over a switch are described. In one or more implementations, a procedure described herein reduces overhead (e.g., atomic or gather operations) for triggering or offloading collective operations onto one or more switches by allocating a symmetric memory across a plurality of processing elements (PEs) connected to a switch. For example, a symmetric memory is allocated across multiple PEs such that each data buffer of each PE is stored at a same relative position in the symmetric memory of the PE. A leader PE then sends a buffer offset to the switch, which the switch uses to compute individual memory addresses of the buffers in each PE. This approach advantageously reduces an overall latency associated with offloading a collective operation by avoiding costly atomic and/or gather operations associated with traditional offloaded collectives triggering processes. The described approach also advantageously uses a short message from one PE to trigger the collective regardless of the number of participating PEs.

In some aspects, the techniques described herein relate to a system including: a plurality of processing elements (PEs), wherein a symmetric memory is allocated in each of the plurality of PEs; and a switch connected to the plurality of PEs, wherein the switch is to: receive, from a first processing element (PE) of the plurality of PEs, a message that includes a buffer offset, compute, based on the buffer offset, a first memory address of a first buffer in a first symmetric memory of the first PE and a second memory address of a second buffer in a second symmetric memory of a second PE of the plurality of PEs, and initiate, based on the first memory address and the second memory address, a direct memory access operation to access the first buffer and the second buffer.

In some aspects, the techniques described herein relate to a system, wherein the switch is further to perform a collective operation based on first data stored in the first buffer and second data stored in the second buffer.

In some aspects, the techniques described herein relate to a system, wherein the switch is to trigger performance of the collective operation in response to receiving the message from the first PE.

In some aspects, the techniques described herein relate to a system, further including: a memory to store a base address table (BAT) indicating a base address of each symmetric memory allocated in the plurality of PEs.

In some aspects, the techniques described herein relate to a system, wherein the switch is further to: retrieve, from the BAT, a first base address of the first symmetric memory and a second base address of the second symmetric memory, compute the first memory address based on the first base address and the buffer offset, and compute the second memory address based on the second base address and the buffer offset.

In some aspects, the techniques described herein relate to a system, wherein the memory storing the BAT is included in the switch.

In some aspects, the techniques described herein relate to a system, wherein the memory storing the BAT is outside the switch.

In some aspects, the techniques described herein relate to a system, wherein each PE of the plurality of PEs is to process a respective portion of data associated with a collective operation assigned to the plurality of PEs and the switch.

In some aspects, the techniques described herein relate to a system, wherein the PE is to update a respective buffer in a respective symmetric memory of the PE based on the processed respective portion of the data.

In some aspects, the techniques described herein relate to a system, wherein the buffer offset is a send buffer offset, wherein the message further includes a receive buffer offset, wherein the switch is further to: compute, based on the receive buffer offset, a first receive buffer memory address of a first receive buffer in the first symmetric memory and a second receive buffer memory address of a second receive buffer in the second symmetric memory.

In some aspects, the techniques described herein relate to a method including: receiving, from a first processing element (PE) of a plurality of processing elements (PEs) connected to a switch, a message that includes a buffer offset, wherein a symmetric memory is allocated in each of the plurality of PEs; computing, based on the buffer offset, a first memory address of a first buffer in a first symmetric memory of the first PE and a second memory address of a second buffer in a second symmetric memory of a second PE of the plurality of PEs; and initiating, based on the first memory address and the second memory address, a direct memory access operation to access the first buffer and the second buffer.

In some aspects, the techniques described herein relate to a method, further including performing a collective operation based on first data stored in the first buffer and second data stored in the second buffer.

In some aspects, the techniques described herein relate to a method, further including triggering performance of the collective operation in response to receiving the message from the first PE.

In some aspects, the techniques described herein relate to a method, further including: retrieving, from a memory storing a base address table indicating a base address of each symmetric memory allocated in the plurality of PEs, a first base address of the first symmetric memory and a second base address of the second symmetric memory; computing the first memory address based on the first base address and the buffer offset; and computing the second memory address based on the second base address and the buffer offset.

In some aspects, the techniques described herein relate to a method, wherein the buffer offset is a send buffer offset, wherein the message from the first PE further includes a receive buffer offset, the method further including: computing, based on the receive buffer offset, a first receive buffer memory address of a first receive buffer in the first symmetric memory and a second receive buffer memory address of a second receive buffer in the second symmetric memory.

In some aspects, the techniques described herein relate to a method including: receiving, from a first processing element (PE) of a plurality of processing elements (PEs) connected to a switch, a message that includes a buffer offset, wherein a symmetric memory is allocated in each of the plurality of PEs; computing, based on the buffer offset, a first memory address of a first buffer in a first symmetric memory of the first PE and a second memory address of a second buffer in a second symmetric memory of a second PE of the plurality of PEs; and accessing, based on the first memory address and the second memory address, the first buffer and the second buffer.

In some aspects, the techniques described herein relate to a method, further including performing a collective operation based on first data stored in the first buffer and second data stored in the second buffer.

In some aspects, the techniques described herein relate to a method, further including triggering performance of the collective operation in response to receiving the message from the first PE.

In some aspects, the techniques described herein relate to a method, further including: retrieving, from a base address table indicating a base address of each symmetric memory allocated in the plurality of PEs, a first base address of the first symmetric memory and a second base address of the second symmetric memory; computing the first memory address based on the first base address and the buffer offset; and computing the second memory address based on the second base address and the buffer offset.

In some aspects, the techniques described herein relate to a method, wherein the buffer offset is a send buffer offset, wherein the message from the first PE further includes a receive buffer offset, the method further including: computing, based on the receive buffer offset, a first receive buffer memory address of a first receive buffer in the first symmetric memory and a second receive buffer memory address of a second receive buffer in the second symmetric memory.

FIG. 1 is a block diagram of a non-limiting example distributed computing system for triggering and/or offloading collective operations over a switch. The system 100 is as a non-limiting illustrative example of any type of distributed computing system or computing device that includes multiple processing elements 102, 104, 106, 108 and a switch 110 that are interconnected according to any network topology (e.g., such as the tree network topology shown) to perform a collective operation in accordance with the present disclosure. Further, the illustrated example represents how a collective operation processes based on underlying procedures, library calls, hardware configurations, etc. In alternate examples, system 100 includes fewer or more processing elements and/or switches connected in similar or different network topologies than the network topology shown.

In examples, the processing elements 102, 104, 106, 108 and the switch 110 are implemented in a same node of a multi-node system. In alternate examples, the system 100 includes fewer or more processing elements and/or switches implemented in one or more nodes.

In examples, the plurality of processing elements 102, 104, 106, 108 and the switch 110 are interconnected using data links (e.g., wired or wireless) and configured to communicate messages to one another to collectively perform an operation (e.g., all-gather, all-reduce, etc.), as described herein. Example wired connections include, but are not limited to, buses connecting two or more of the processing elements 102, 104, 106, 108, and/or the switch 110. In variations, the system 100 is configured differently (e.g., has more, fewer, or different components).

The processing elements 102, 104, 106, 108 include any type of one or more processing units, such as graphics processing units (GPUs), central processing units (CPUs), arithmetic logic units (ALU), or any other type of processing device configured to execute computer instructions stored in a memory (e.g., system memory, local memory of a processing element, etc.) and/or other non-transitory storage medium. Although system 100 is shown to include four processing elements 102, 104, 106, 108, in alternate examples, system 100 includes fewer or more processing elements.

In the illustrated example, each of the processing elements 102, 104, 106, 108 includes a symmetric memory 112, 114, 116, 118 allocated across the plurality of processing elements to define a network address space 120. For example, where the illustrated components of the system 100 are included in a node, the network address space 120 is an intra-node symmetric memory belonging to the node. In examples, the network address space 120 is setup at runtime (e.g., by a process thread executing in any of the processing elements 102, 104, 106, 108 or any other process thread in the system 100) or by a fabric manager (e.g., during a virtual machine (VM) setup procedure). In various examples described herein, memory allocation in the network address space 120 can be implemented explicitly or implicitly.

As an example of an explicit allocation procedure, a user of the system 100 allocates send and receive buffers for collective communication explicitly within the network address space 120 (i.e., in each of the symmetric memories 112, 114, 116, 118) by using a dedicated memory allocation application programming interface or API (e.g., similar to 'shmem_malloc( )'). When the allocation API is called (e.g., in a process thread executing at any of the processing elements 102, 104, 106, 108, etc.) for example, the system 100 returns pointers (e.g., memory address pointers) for the send and/or receive buffers in the network address space 120 that are guaranteed to be symmetric with respect to corresponding send and/or receive buffers of other processing elements. For example, where the API is called by the processing element 102, a first send buffer is allocated in the symmetric memory 112 at a first memory address that is at a particular offset from a first base address of the symmetric memory 112 (e.g., BaseAddress1+SendBufferOffset). Continuing with this example, when the API is called by the processing element 104, a second send buffer is allocated the symmetric memory 114 at a second memory address that is at the same particular offset from a second base address of the symmetric memory 114 (e.g., BaseAddress2+SendBufferOffset).

In an example implicit allocation procedure, a user of the system 100 calls a standard memory mapping API (e.g., similar to 'mmap( )' or 'hipMemMap( )') in any of the processing elements 102, 104, 106, 108, and the system 100 transparently maps send and/or receive buffers for all the processing elements symmetrically in parallel. For instance, since the network address space 120 is configured to allocate memory space symmetrically across the plurality of processing elements 102, 104, 106, 108, a first available address in the network address space 120 implicitly maps a respective send buffer in each of the processing elements in parallel (e.g., at a same offset from respective base addresses of the symmetric memories 112, 114, 116, 118) without any explicit synchronization among API calls from the other processing elements.

In the illustrated example, the switch 110 includes a local processing unit 122, a memory 124, and one or more direct memory access (DMA) queues 126. The processing unit 122 includes one or more CPUs, GPUs, ALUs, or any other type of processor configured to perform computations locally in the switch 110 (e.g., offloaded reduction, aggregation, broadcast, and/or multicast collective operations).

The memory 124 is a device or system that is used to store information. In an example, the memory 124 includes semiconductor memory where data is stored within memory cells on one or more integrated circuits. In an example, memory 124 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 124 corresponds to or includes non-volatile memory, examples of which include flash memory, read-only memory (ROM), programmable read-only memory (PROM), erasable programmable read-only memory (EPROM), and electronically erasable programmable read-only memory (EEPROM).

In the illustrated example, memory 124 includes a base address table 128. In examples, base address table 128 stores base addresses of each symmetric memory 112, 114, 116, 118 allocated in the plurality of processing elements 102, 104, 106, 108. In an example, the symmetric memory 112 is mapped to a range of memory addresses in the processing element 102. In this example, a base address of the symmetric memory 112 includes a pointer to a first physical or virtual memory address in the range of memory addresses (e.g., a pointer to a first memory page, etc.). Thus, in this example, the base address table 128 stores the base address of the symmetric memory 112 corresponding to the physical or virtual memory address of at a beginning of the symmetric memory 112. Similarly, in this example, the base address table 128 stores base addresses (e.g., physical or virtual memory addresses) of the other processing elements 104, 106, and/or 108.

In the illustrated example, the memory 124 storing the base address table 128 is shown to be included in the switch 110 (e.g., a local memory of the switch). In alternate examples however, the memory 124 is instead implemented outside the switch 110 (e.g., a system memory accessible to the switch 110).

The DMA queues 126 include any combination of hardware or software components (e.g., a DMA engine) configured to process DMA requests (e.g., messages transmitted from the processing elements 102, 104, 106, 108). In an example, the processing element 104 transmits a message 130 over a link (e.g., fabric) connecting the processing element 104 to the switch 110. For example, the switch 110 supports a DMA channel that receives DMA packets or descriptors (e.g., the message 130) from the processing element 104 and stores them in the DMA queues 126 for processing by a DMA engine of the switch 110. In an example, a DMA descriptor is fetched from memory by the DMA engine or written into the collectives engine. In an example, a centralized entity generates a DMA descriptor after receiving memory addresses from each of the processing elements 102, 104, 106, 108.

In examples, the system 100 is configured to select a lead processing element from a group of processing elements 102, 104, 106, 108 assigned to process a chunk of input data collectively. In an example, each processing element of the group of processing elements 102, 104, 106, 108 processes (e.g., extracts, conditions, computes, etc.) and stores a respective portion of the data chunk in its respective send buffer. The lead processing element (e.g., processing element 104) then sends the message 130 to trigger performance of the collective operation by the switch 110 on the data chunk. In some instances, the lead processing element 104 uses an intra-node barrier or other process to detect when the other processing elements are ready to contribute their respective portions of the data chunk.

Continuing with the example above, the message 130 includes a buffer offset 132 indicating a location of a send buffer of the processing element 104 relative to a base address of the symmetric memory 114. In various examples, the message 130 also includes other information about the collective operation, such as a collective type (e.g., all-reduce, sum, product, etc.), a size (e.g., of the data chunk), and/or a group identifier (e.g., a bitmask that indicates which of the plurality of processing elements 102, 104, 106, 108 are assigned for the collective operation). In an example, the switch 110 then stores the message 130 in the DMA queues 126 to facilitate performing the collective operation locally.

In an example, the switch 110 also retrieves base addresses of the symmetric memories 112, 114, 116, 118 (e.g., from the base address table 128) based on the message 130 indicating that the processing elements 102, 104, 106, and 108 are assigned to provide the data chunk for the collective operation. The switch 110 then computes memory addresses of each send buffer of the processing elements 102, 104, 106, 108 based on the buffer offset 132 and the respective base addresses of the processing elements. For example, the switch 110 computes a first memory address of a first send buffer of the processing element 102 in the symmetric memory 112 by adding the buffer offset 132 to a first base address of the symmetric memory 112, a second memory address of a second send buffer of the processing element 104 by adding the buffer offset 132 to a second base address of the symmetric memory 114, and so on. The switch 110 then uses the computed memory addresses to access (e.g., by initiating a DMA operation) the respective data portions stored in the respective send buffers of the processing elements 102, 104, 106, 108.

The switch 110 then performs the collective operation on the respective data portions locally (e.g., using the processing unit 122, etc.). As an example, where the collective operation is a data reduction operation (e.g., a sum or product), the switch 110 performs a reduction computation on the individual data portions of the various processing elements to generate a reduction result (e.g., sum, product, etc.).

As another example, where the collective operation is an all-reduce operation, the switch 110 transmits the reduction result to the plurality of processing elements 102, 104, 106, 108. For instance, the message 130 also includes a receive buffer offset indicating a relative location of a receive buffer in the symmetric memory 114. In this instance, the switch 110 uses the receive buffer offset to similarly compute receive buffer memory addresses of the respective receive buffers of the processing elements 102, 104, 106, 108 in the symmetric memories 112, 114, 116, 118. The switch 110 then uses the computed receive buffer memory addresses to initiate DMA operations to store the reduction result in the respective receive buffers of the processing elements.

Notably, the present disclosure enables triggering performance of the offloaded collective operation according to a low-latency and efficient approach as described above. Further, in some examples, the lead processing element is optimally selected for each data chunk to balance processing loads and/or network congestion in between the switch 110 the various processing elements, thereby allowing the system 100 to achieve further performance improvements.

Figure 2:
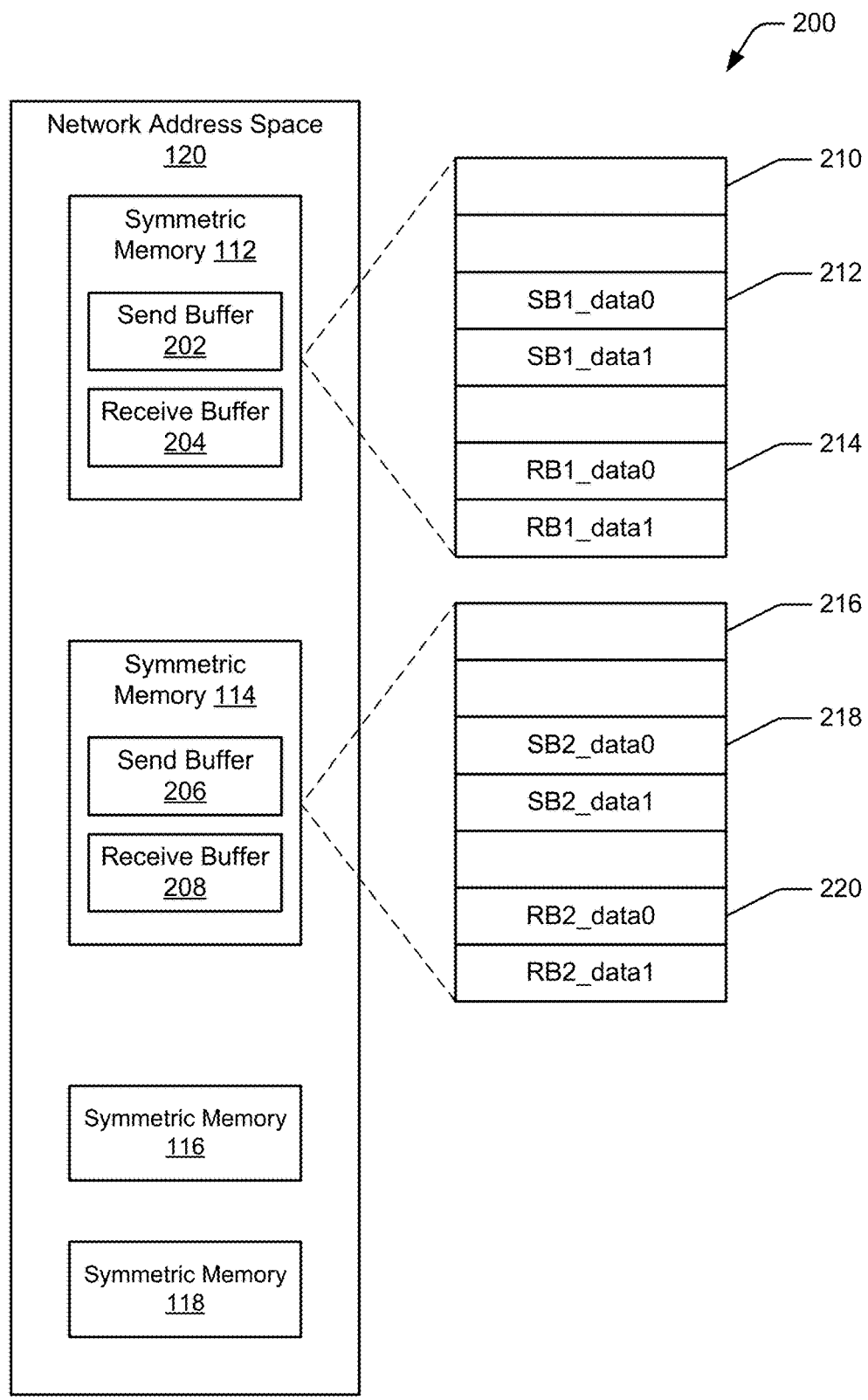
FIG. 2 depicts a non-limiting example system in which an intra-node symmetric memory is allocated for offloading a collective operation onto a switch according to a low-latency approach.

FIG. 2 depicts a non-limiting example system 200 in which an intra-node symmetric memory is allocated for offloading a collective operation onto a switch according to a low-latency approach. In the illustrated example, the network address space 120 includes the symmetric memories 112, 114, 116, and 118, in line with the discussion above. As shown, the symmetric memory 112 includes a send buffer 202 and a receive buffer 204, and the symmetric memory 114 includes a send buffer 206, and a receive buffer 208.

In line with the discussion above, the send buffers 202, 206 are used to store data that is to be sent to other processing elements and/or to the switch 110 to facilitate performing a collective operation. Further, the receive buffers 204, 208 are used to store data received from other processing elements and/or the switch 110 as part of collective communications. Although not shown, in examples where the processing elements 102, 104, 106, 108 are assigned to contribute data for a collective operation, the symmetric memories 116 and/or 118 similarly include send buffers and receive buffers.

In the illustrated example, each of the symmetric memories 112, 114 includes a symmetric memory where data associated with the send buffer 202 (e.g., SB1_data0, SB1_data1) and the send buffer 206 (e.g., SB2_data0, SB2_data1) are stored at a first offset position within the respective symmetric memories 112, 114, and data associated with the receive buffer 204 (e.g., RB1_data0, RB1_data1) and the receive buffer 208 (e.g., RB2_data0, RB2_data1) are stored at a second offset position within the respective symmetric memories 112, 114.

For instance, in the illustrated example, each of the symmetric memories 112, 114 includes seven memory pages (beginning respectively with memory page 210 and 216). Memory page 210, for example, is at the beginning of the symmetric memory 112 and has a first base address (stored in the base address table 128), memory page 212 (corresponding to the send buffer 202) is at a send buffer offset from the first base address of memory page 210, and memory page 214 (corresponding to the receive buffer 204) is at a receive buffer offset from the first base address of memory page 210. Similarly, in the illustrated example, memory page 216 is at the beginning of the symmetric memory 114 and has a second base address (stored in the base address table 128), memory page 218 (corresponding to the send buffer 206) is also at the send buffer offset relative to the second base address, and memory page 220 (corresponding to the receive buffer 208) is also at the receive buffer offset location relative to the second base address of memory page 216.

Thus, in line with the discussion above, the switch 110 uses the send buffer offset to compute memory addresses of the send buffer 202 (e.g., by adding it to the first base address of the symmetric memory 112) and the send buffer 206 (e.g., by adding it to the second base address of the symmetric memory 114). Similarly, the switch 110 uses the receive buffer offset to compute memory addresses of the receive buffer 204 (e.g., by adding it to the first base address of the symmetric memory 114) and the receive buffer 208 (e.g., by adding it to the second base address of the symmetric memory 114).

Figure 3:
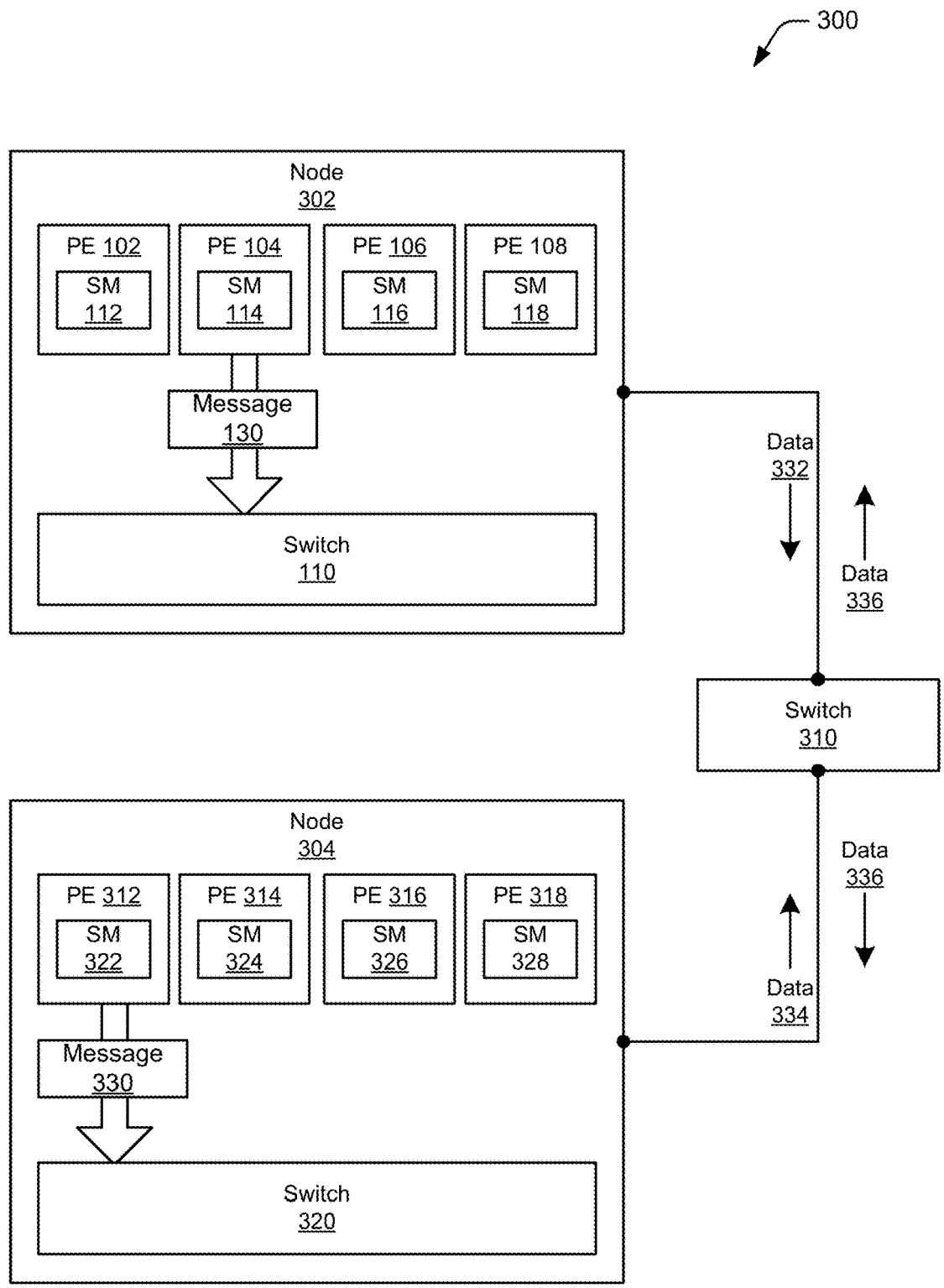
FIG. 3 depicts a non-limiting example system having a two-level switch topology and configured to offload collectives onto one or more switches according to a low-latency approach.

FIG. 3 depicts a non-limiting example system 300 having a two-level switch topology and configured to offload collectives onto one or more switches according to a low-latency approach. In the illustrated example, the system 300 includes nodes 302, 304 (corresponding to a first level of a two-level network topology) that are connected to a switch 310 (corresponding to a second level of the two-level network topology). It is noted that the example techniques described herein can be implemented using any type of network topology and may include fewer or more components (e.g., nodes, switches, etc.) than those shown.

In the illustrated example, the node 302 includes the plurality of processing elements 102, 104, 106, 108 and the switch 110. Thus, in the illustrated example, the symmetric memories 112, 114, 116, 118 define the network address space 120 (i.e., an intra-node network address space). Node 304 similarly includes a plurality of processing elements 312, 314, 316, 318 (which may be similar to processing elements 102, 104, 106, 108) and a switch 320 (which may be similar to switch 310). In examples, system 300 is configured to allocate a symmetric memory 322, 324, 326, 328 across the plurality of processing elements 312, 314, 316, 318 to define a second network address space (i.e., a second intra-node network address space similar to the first intra-node network address space 120 of node 302).

In examples, the second network address space (including symmetric memories 322-328) of node 304 is not necessarily symmetric with respect to the first network address space (including symmetric memories 112-118) of node 302. Thus, in some examples, the system 300 advantageously enables scalability of the techniques described in the present disclosure at an intra-node level without necessarily enforcing symmetry across multiple nodes (e.g., where processing elements 312-318 are not necessarily directly connected to switch 110, etc.). In alternate examples, the system 300 is configured to define a symmetric network address space across two or more nodes. However, for the sake of example, the first intra-node network address space 120 of node 302 is not necessarily symmetric with respect to the second intra-node network address space of node 304.

In examples, the system 300 is configured to perform a collective operation (e.g., all-reduce, all-to-all, etc.) using the nodes 302, 304, and switch 310 according to the network topology of system 300. For example, the system 300 is configured to use a first intra-node barrier at node 302 to determine when the processing elements 102, 104, 106, 108 are ready to provide data contributions for the collective operation to the switch 110; and a second intra-node barrier at node 304 to determine when the processing elements 312-318 are ready to provide data contributions for the collective operation to the switch 320

In examples, the system 300 is also configured to select a leader processing element for the nodes 302 and 304. For example, the processing element 104 is selected as the leader processing element at node 302 and the processing element 312 is selected as the leader processing element at node 304.

Next, in order to trigger performance of the collective operation, the leader processing elements are configured to send a respective message to their respective node switches. In the example shown, for instance, the leader processing element 104 of node 302 sends the message 130 to switch 110 and the leader processing element 312 of node 304 sends message 330 to the switch 320. As noted earlier, the message 130 includes one or more buffer offsets (e.g., buffer offset 132) indicating a relative location of data buffers (e.g., send and/or receive buffers) in each of the symmetric memories 112-118 (i.e., relative to respective base addresses of the symmetric memories). Similarly, the message 330 includes one or more buffer offsets indicating relative locations of corresponding data buffers (e.g., send and/or receive buffers) in each of the symmetric memories 322-328 (i.e., relative to respective base addresses of the symmetric memories 322-328).

In some examples, the switches 110 and 320 are configured as aggregation nodes that perform partial collective operations to generate partially reduced data based on the data available from their respective child processing elements 112-118 and 312-318. For example, where the collective operation is an all-reduce operation, the switch 110 is configured to compute memory addresses of send (or receive) buffers based on the buffer offset 132 and the base addresses of the symmetric memories 112-118 (stored in base address table 128). The switch 110 in this example then performs a partial collective operation to generate a partial reduction result (e.g., data 332) by performing a reduction computation on data elements accessed from the buffers in the symmetric memories of the processing elements 102-108. Similarly, the switch 320 is configured to compute memory addresses of send (or receive) buffers based on a buffer offset (not shown) included in the message 330, use the computed memory addresses to access and retrieve a second set of data elements from the buffers in the symmetric memories of the processing elements 312-318, and perform a partial collective operation (e.g., reduction computation) on the second set of data elements to generate a second partial reduction result (e.g., data 334).

Continuing with the example above, the switches 110 and 320 are then configured to respectively transmit the partial results (e.g., data 332, 334) to the switch 310. In some implementations (e.g., pull model), the switches 110 and 320 are configured to respectively transmit their partial reduction results in response to a pull request from the parent switch 310. In some examples, the switches 110 and 320 perform their respective partial collective operations independently (e.g., at different instances of time).

In various examples, the parent switch 310 is configured to wait for the partial reduction results (e.g., data 332 and 334) from the child switches 110 and 320 before triggering further performance of the collective operation, and/or may schedule the further performance of the collective operation according to any other collective scheduling algorithm.

Next, in examples, the switch 310 is configured to resume performance of the collective operation by reducing the received partial results (e.g., data 332 and 334) to generate a final reduction result (e.g., data 336). In examples where the collective operation is an all-reduce operation, the switch 310 is then configured to transmit the final reduction results (e.g., data 336) to the switches 110 and 320 as shown so as to broadcast and/or multicast the final results to the individual processing elements 102-108 and 322-328.

For example, the switch 110 computes memory addresses of receive buffers in the symmetric memories 112-118 of the processing elements 102-108 using a receive buffer offset indicated in the message 130 (e.g., by adding the receive buffer offset to base addresses of the symmetric memories), and uses the computed memory addresses to transmit (e.g., via a DMA operation) the final reduction results (e.g., data 336) into the receive buffers of the processing elements 102-108. Similarly, switch 320 computes memory addresses of receive buffers of the processing elements 312-318 and uses the computed memory addresses to propagate the final reduction results (e.g., data 336) via one or more DMA operations into the receive buffers in the symmetric memories 322-328 of the processing elements 312-318.

Figure 4:
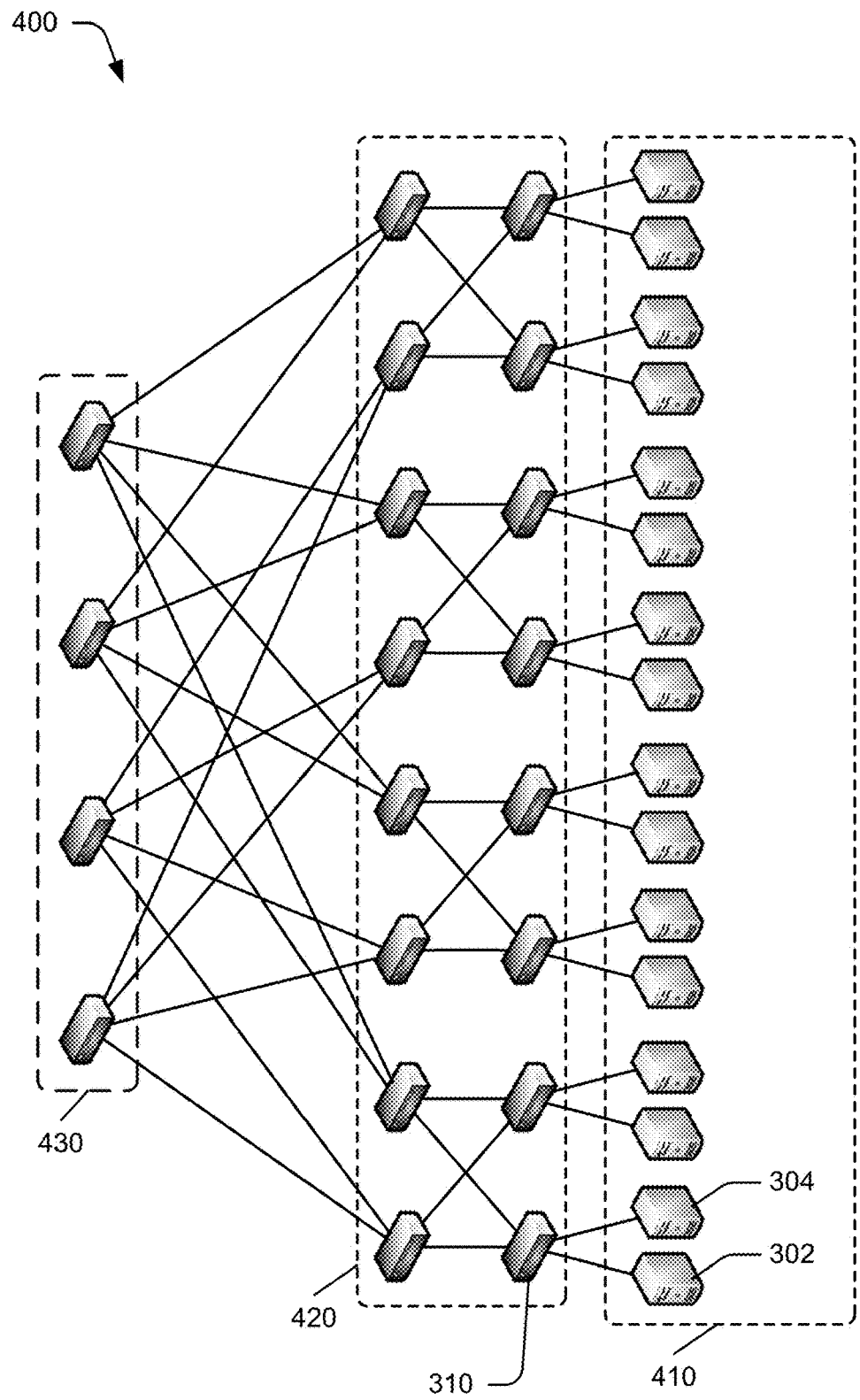
FIG. 4 depicts a non-limiting example system having a fat-tree network topology and configured to offload collectives over one or more switches according to a low-latency approach.

FIG. 4 depicts a non-limiting example system 400 having a fat-tree network topology and configured to offload collectives over one or more switches according to a low-latency approach. The system 400 includes a network of nodes arranged to include an edge layer 410 (which includes nodes 302, 304, etc.), an aggregation layer 420 (which includes switch 310, etc.), and a core layer 430. As noted earlier, the example techniques described herein can be implemented using any type of network topology.

In an example, a collective operation (e.g., all-reduce) is assigned to a network of nodes that includes sixteen nodes in the edge layer 410, exemplified by nodes 302, 304. In this example, if the assigned nodes are the switch 310 generates a partial reduction result that is then combined and/or further reduced at a parent node of the switch 310, and so on, until the final reduction result is generated (e.g., in the core layer 430) and propagated back to the nodes 302, 304, etc. in the edge layer 410, according to the network topology of the system 400.

Figure 5:
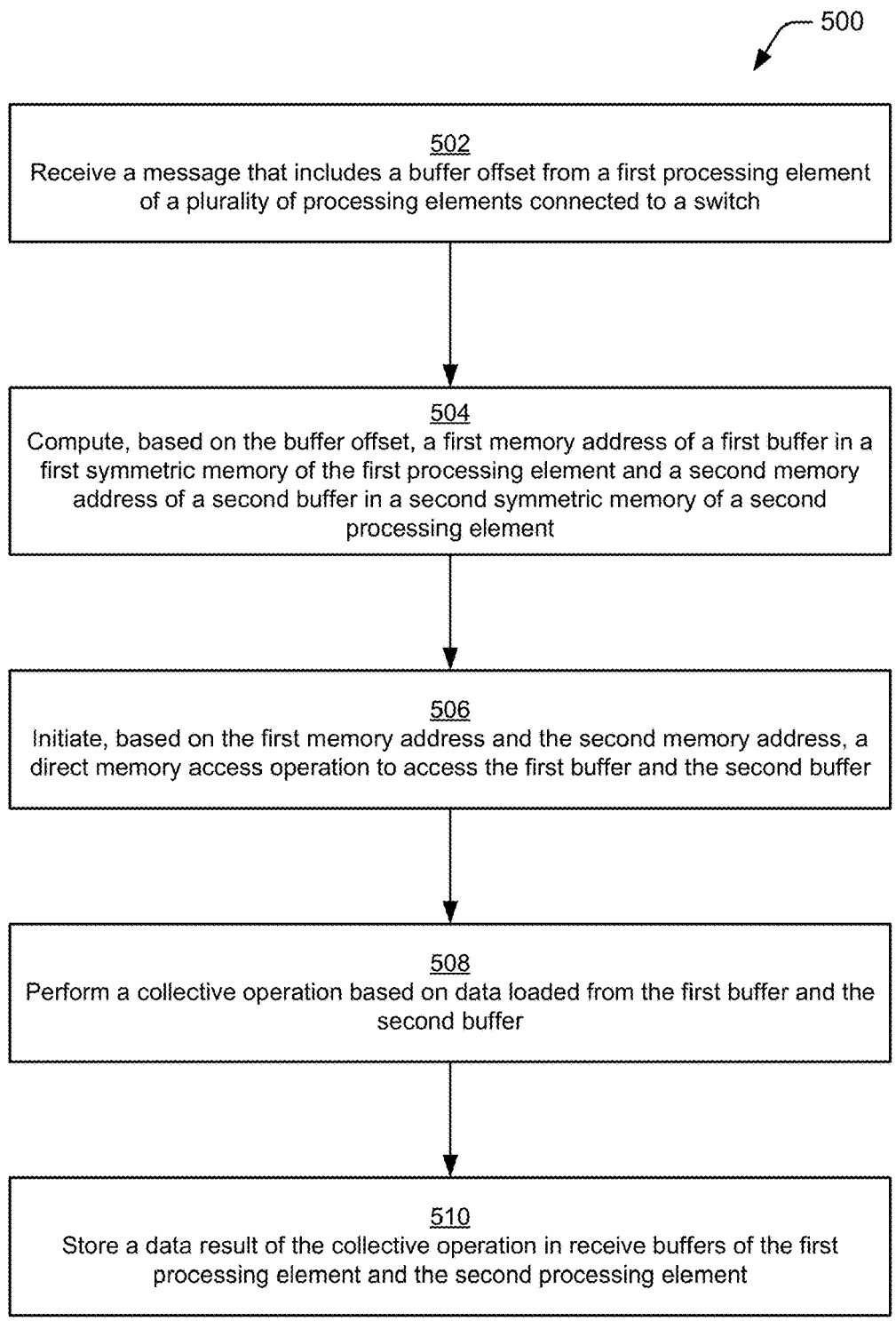
FIG. 5 depicts a procedure in an example implementation of low-latency offloaded collectives over a switch.

FIG. 5 depicts a procedure 500 in an example implementation of low-latency offloaded collectives over a switch. The order in which the procedure 500 is described is not intended to be construed as a limitation. In examples, any number or combination of the described operations is performed in any order to perform the procedure 500 or an alternate procedure, as described herein.

At block 502, a switch receives a message that includes a buffer offset from a first processing element of a plurality of processing elements connected to the switch. For example, the switch 110 receives the message 130 (which includes the buffer 132) from the processing element 104.

At block 504, the switch computes, based on the buffer offset, a first memory address of a first buffer in a first symmetric memory of the first processing element and a second memory address of a second buffer in a second symmetric memory of a second processing element. For example, the switch 110 computes the memory address of the send buffer 202 (e.g., the address of memory page 212) of the processing element 102 by adding the buffer offset 132 to a base address of the symmetric memory 112. Similarly, the switch 110 computes the memory address of the send buffer 206 by adding the buffer offset 132 to a base address of the symmetric memory 114.

At block 506, the switch initiates, based on the first memory address and the second memory address, a direct memory access operation to access the first buffer and the second buffer. For example, the switch 110 uses a DMA engine to access the data stored in the send buffer 202 (e.g., SB1_data0, SB1_data1) and the send buffer 206 (e.g., SB2_data0, SB2_data1) using the first and second memory addresses computed at block 504.

At block 508, the switch performs a collective operation based on data loaded from the first buffer and the second buffer. For example, the switch 110 performs a reduction operation on first data (e.g., SB1_data0) read from the send buffer 202 and second data (e.g., SB2_data0) read from send buffer 206 to compute a reduced data result (e.g., data result=Reduce (SB1_data0, SB2_data0)).

At block 510, the switch stores a data result of the collective operation in receive buffers of the first processing element and the second processing element. For example, the switch 110 writes back the reduced data result (e.g., data result=Reduce (SB1_data0, SB2_data0)) into receive buffers 204, 208 of the processing elements 102, 104.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing elements 102-108, the switch 110, the processing unit 122, the memory 124, the direct memory access queues 126, and/or the base address table 128) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
    a plurality of processing elements (PEs), wherein a symmetric memory is allocated in each of the plurality of PEs; and
    a switch connected to the plurality of PEs, wherein the switch is to:
        receive, from a first processing element (PE) of the plurality of PEs, a message that includes a buffer offset,
        compute, based on the buffer offset, a first memory address of a first buffer in a first symmetric memory of the first PE and a second memory address of a second buffer in a second symmetric memory of a second PE of the plurality of PEs, and
        initiate, based on the first memory address and the second memory address, a direct memory access operation to access the first buffer and the second buffer.

2. The system of claim 1, wherein the switch is further to perform a collective operation based on first data stored in the first buffer and second data stored in the second buffer.

3. The system of claim 2, wherein the switch is to trigger performance of the collective operation in response to receiving the message from the first PE.

4. The system of claim 1, further comprising:
    a memory to store a base address table (BAT) indicating a base address of each symmetric memory allocated in the plurality of PEs.

5. The system of claim 4, wherein the switch is further to:
    retrieve, from the BAT, a first base address of the first symmetric memory and a second base address of the second symmetric memory,
    compute the first memory address based on the first base address and the buffer offset, and
    compute the second memory address based on the second base address and the buffer offset.

6. The system of claim 4, wherein the memory storing the BAT is included in the switch.

7. The system of claim 4, wherein the memory storing the BAT is outside the switch.

8. The system of claim 1, wherein each PE of the plurality of PEs is to process a respective portion of data associated with a collective operation assigned to the plurality of PEs and the switch.

9. The system of claim 8, wherein the PE is to update a respective buffer in a respective symmetric memory of the PE based on the processed respective portion of the data.

10. The system of claim 1, wherein the buffer offset is a send buffer offset, wherein the message further includes a receive buffer offset, wherein the switch is further to:
    compute, based on the receive buffer offset, a first receive buffer memory address of a first receive buffer in the first symmetric memory and a second receive buffer memory address of a second receive buffer in the second symmetric memory.

11. A method comprising:
receiving, from a first processing element (PE) of a plurality of processing elements (PEs) connected to a switch, a message that includes a buffer offset, wherein a symmetric memory is allocated in each of the plurality of PEs;
computing, based on the buffer offset, a first memory address of a first buffer in a first symmetric memory of the first PE and a second memory address of a second buffer in a second symmetric memory of a second PE of the plurality of PEs; and
initiating, based on the first memory address and the second memory address, a direct memory access operation to access the first buffer and the second buffer.

12. The method of claim 11, further comprising performing a collective operation based on first data stored in the first buffer and second data stored in the second buffer.

13. The method of claim 12, further comprising triggering performance of the collective operation in response to receiving the message from the first PE.

14. The method of claim 11, further comprising:
retrieving, from a memory storing a base address table indicating a base address of each symmetric memory allocated in the plurality of PEs, a first base address of the first symmetric memory and a second base address of the second symmetric memory;
computing the first memory address based on the first base address and the buffer offset; and
computing the second memory address based on the second base address and the buffer offset.

15. The method of claim 11, wherein the buffer offset is a send buffer offset, wherein the message from the first PE further includes a receive buffer offset, the method further comprising:
computing, based on the receive buffer offset, a first receive buffer memory address of a first receive buffer in the first symmetric memory and a second receive buffer memory address of a second receive buffer in the second symmetric memory.

16. A method comprising:
receiving, from a first processing element (PE) of a plurality of processing elements (PEs) connected to a switch, a message that includes a buffer offset, wherein a symmetric memory is allocated in each of the plurality of PEs;
computing, based on the buffer offset, a first memory address of a first buffer in a first symmetric memory of the first PE and a second memory address of a second buffer in a second symmetric memory of a second PE of the plurality of PEs; and
accessing, based on the first memory address and the second memory address, the first buffer and the second buffer.

17. The method of claim 16, further comprising performing a collective operation based on first data stored in the first buffer and second data stored in the second buffer.

18. The method of claim 17, further comprising triggering performance of the collective operation in response to receiving the message from the first PE.

19. The method of claim 16, further comprising:
retrieving, from a base address table indicating a base address of each symmetric memory allocated in the plurality of PEs, a first base address of the first symmetric memory and a second base address of the second symmetric memory;
computing the first memory address based on the first base address and the buffer offset; and
computing the second memory address based on the second base address and the buffer offset.

20. The method of claim 16, wherein the buffer offset is a send buffer offset, wherein the message from the first PE further includes a receive buffer offset, the method further comprising:
computing, based on the receive buffer offset, a first receive buffer memory address of a first receive buffer in the first symmetric memory and a second receive buffer memory address of a second receive buffer in the second symmetric memory.

* * * * *